United States Patent
Schley-May et al.

(10) Patent No.: US 7,602,596 B1
(45) Date of Patent: Oct. 13, 2009

(54) VARIOUS METHODS AND APPARATUSES FOR A SURGE PROTECTION SCHEME

(75) Inventors: James T. Schley-May, Nevada City, CA (US); Richard Barry Angell, Nevada City, CA (US); Steve Maher, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 355 days.

(21) Appl. No.: 11/212,161

(22) Filed: Aug. 25, 2005

(51) Int. Cl.
*H02H 9/00* (2006.01)

(52) U.S. Cl. ..................................................... 361/119
(58) Field of Classification Search ................... 361/119
See application file for complete search history.

(56) References Cited

U.S. PATENT DOCUMENTS

| | | | | |
|---|---|---|---|---|
| 2,862,152 | A * | 11/1958 | Ryden | 361/16 |
| 3,500,133 | A * | 3/1970 | Jensen et al. | 361/173 |
| 4,262,317 | A * | 4/1981 | Baumbach | 361/124 |
| 4,528,422 | A * | 7/1985 | Cupani | 379/42 |
| 5,289,335 | A * | 2/1994 | Kato | 361/117 |
| 5,537,287 | A * | 7/1996 | Dreier | 361/119 |
| 6,252,754 | B1 | 6/2001 | Chaudhry | |
| 6,876,742 | B1 | 4/2005 | Sacca | |
| 7,154,727 | B2 * | 12/2006 | Ghahary | 361/119 |

OTHER PUBLICATIONS

Ardley, Tim, "GDT Application Note GDT Protection Solutions for ADSL and ADSL2+ Solution," 2005, 5 pages.

* cited by examiner

*Primary Examiner*—Ronald W Leja
*Assistant Examiner*—Christopher J Clark
(74) *Attorney, Agent, or Firm*—Blakely, Sokoloff, Taylor & Zafman LLP

(57) ABSTRACT

In general, various methods, apparatuses, and systems for a surge protection circuit for a Public Switched Telephone Network (PSTN) are disclosed. The surge protection circuit includes a first voltage protection device coupled to a first wire of the PSTN. A voltage protection device conducts when voltage applied across the voltage protection device at least meets a set voltage threshold. The surge protection circuit includes a second voltage protection device coupled to a second wire of the PSTN. The second voltage protection device is coupled to the first voltage protection device in series. The surge protection circuit includes a voltage divider device to cause a voltage applied differentially across the first wire and second wire to divide evenly across the first voltage protection device and the second voltage protection device.

4 Claims, 8 Drawing Sheets

VARIOUS METHODS AND APPARATUSES FOR A SURGE PROTECTION SCHEME

FIELD OF THE INVENTION

Embodiments of the invention generally relate to a surge protection scheme. More particularly, an aspect of an embodiment of the invention relates to a surge protection scheme for telecom circuitry.

BACKGROUND OF THE INVENTION

Data communications systems, such as xDigital Subscriber Line (xDSL), are generally required to provide for some form of protection from overvoltage conditions in data communication equipment, such as an xDSL modem. Lightning is a major source of overvoltage conditions on residential wiring. The overvoltage condition can result from a lightning strike or it can be induced in the AC transmission lines by a nearby lightning strike. Overvoltage conditions can also result from power line crosses caused, for example, by a vehicle striking a utility pole. Overvoltage conditions can also result from the loss of the AC neutral. If that occurs, devices that are normally connected to 110 to 120 volts AC are subjected to 220 to 240 volts AC. The loss of the AC neutral can result from corrosion of the meter pan at the service entrance where the meter is located outside the building and is exposed to the elements.

Primary overvoltage protection for telephone lines is provided by surge arresters located in network interface devices mounted on the outside of the building. Grounding for these overvoltage protection devices is provided by means of an earth ground brought into the enclosure at the time of installation and attached to ground bus.

Many users attempt to protect their valuable electronic equipment with plug-in surge suppressors. Such devices do not protect equipment from the large amplitude pulses caused by lightning strikes, although they do offer some protection against low energy transients originating within the home. Moreover, plug-in surge suppressors are generally located far from the earth ground where the electric utilities are brought into the building. A surge suppressor is only as good as the ground to which it is connected. Furthermore, most plug-in secondary surge suppressors being sold today are not designed to withstand the loss of the AC neutral and may create a fire hazard when the AC neutral is lost.

SUMMARY OF THE INVENTION

Various methods, apparatuses, and systems for a surge protection circuit for a Public Switched Telephone Network (PSTN) are disclosed. The surge protection circuit includes a first voltage protection device coupled to a first wire of the PSTN. A voltage protection device conducts when voltage applied across the voltage protection device at least meets a set voltage threshold. The surge protection circuit includes a second voltage protection device coupled to a second wire of the PSTN. The second voltage protection device is coupled to the first voltage protection device in series. The surge protection circuit includes a voltage divider device to cause a voltage applied differentially across the first wire and second wire to divide evenly across the first voltage protection device and the second voltage protection device.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DISCUSSION

Figure 1:
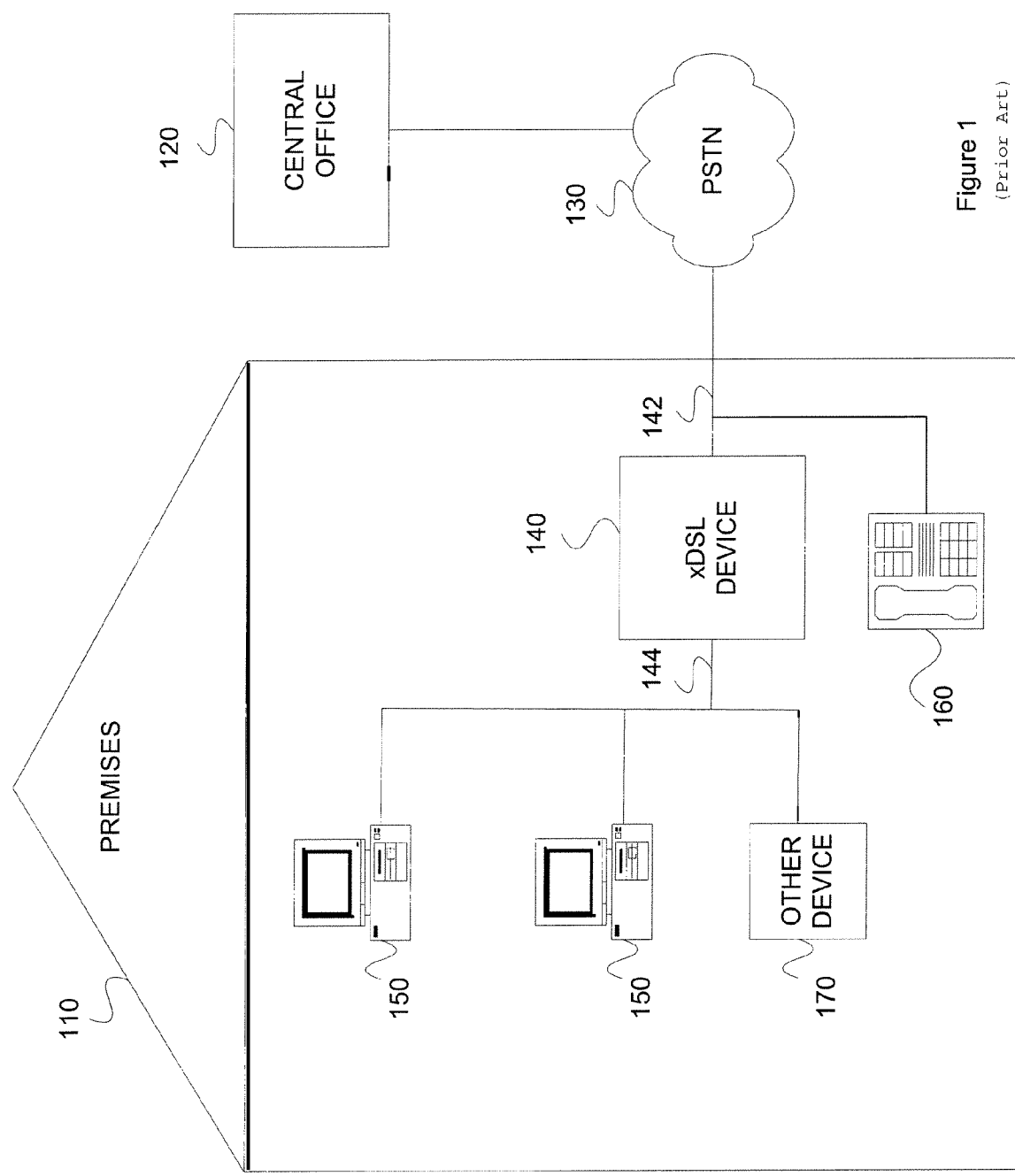
FIG. 1 illustrates a block diagram of an embodiment of a communication system having a digital subscriber line modem that includes a line interface circuit.

In the following description, numerous specific details are set forth, such as examples of specific signals, named components, connections, number of windings in a transformer, example voltages, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first voltage protection device, may be made. However, the specific numeric reference should not be interpreted as a literal sequential order but rather interpreted that the first voltage protection device is different than a second voltage protection device. Thus, the specific details set forth are merely exemplary. The specific details may be varied from and still be contemplated to be within the spirit and scope of the present invention. The term coupled is defined as meaning connected either directly to the component or indirectly to the component through another component.

In general, various methods, apparatuses, and systems for a surge protection circuit for a Public Switched Telephone Network (PSTN) are disclosed. The surge protection circuit includes a first voltage protection device coupled to a first wire of the PSTN. A voltage protection device conducts when voltage applied across the voltage protection device at least meets a set voltage threshold. The surge protection circuit includes a second voltage protection device coupled to a second wire of the PSTN. The second voltage protection device is coupled to the first voltage protection device in series. The surge protection circuit includes a voltage divider device to cause a voltage applied differentially across the first wire and second wire to divide evenly across the first voltage protection device and the second voltage protection device.

A voltage protection device is used to protect a circuit when overvoltages pass into the circuit. Examples of protecting devices include gas discharge tubes (GDT), metal oxide varistors (MOV), transient voltage suppressor (TVS) diodes, thryistors and sidactors (silicon protection device). Generally, these protection devices activate at a certain voltage called the breakover voltage. The breakover voltage is the voltage at which the protection device will breakover and conduct current, thereby clamping the voltage to a level close to ground. For instance, if a protection device has a breakover voltage rating of 500V, then the let thru voltage into the unit is also 500V before the device activates. The greater the let thru voltage the greater the risk to sensitive electronics and the greater the potential for damage to electronic equipment before the protection device activates. It is thus desirable, to provide a better voltage protection scheme.

FIG. 1 illustrates a block diagram of an embodiment of a communication system having a digital subscriber line modem, in which the surge protection circuit can be used. A premises 110, such as home or a business, may couple via a line 142 to a PSTN 130 that provides copper wires as a telecommunications medium and can also include Cat 5 copper cables (not shown) and fiber optic cables (not shown). PSTN 130 may further couple to a central office 120 that provides telecommunication services for a particular area. Central office 120, operated by a service provider, provides switching technology for Plain Old Telephone Service (POTS), Integrated Services Digital Network (ISDN) service, and xDSL service.

In premises 110, an xDSL device 140, such as a DSL modem or router, communicates via line 142 with PSTN 130 and via a path 144 with multiple telecommunication devices. The telecommunication devices include, but are not limited to, computers 150 with network/telecommunication hardware and software (not shown) and other devices 170, such as set-top boxes, home network gateways, PDAs (Personal Digital Assistants), and printers. A telephone 160 may couple to line 142 and includes a low pass filter (not shown) for filtering out non-POTS band signals. Other POTS devices, such as a facsimile machine, may also couple to line 142. Tip and Ring can be the names for the two wires that constitute the twisted pair wire connection between the PSTN telephone or PBX equipment and the central office. This twisted pair may be referred to as the local loop or subscriber loop.

Figure 2:
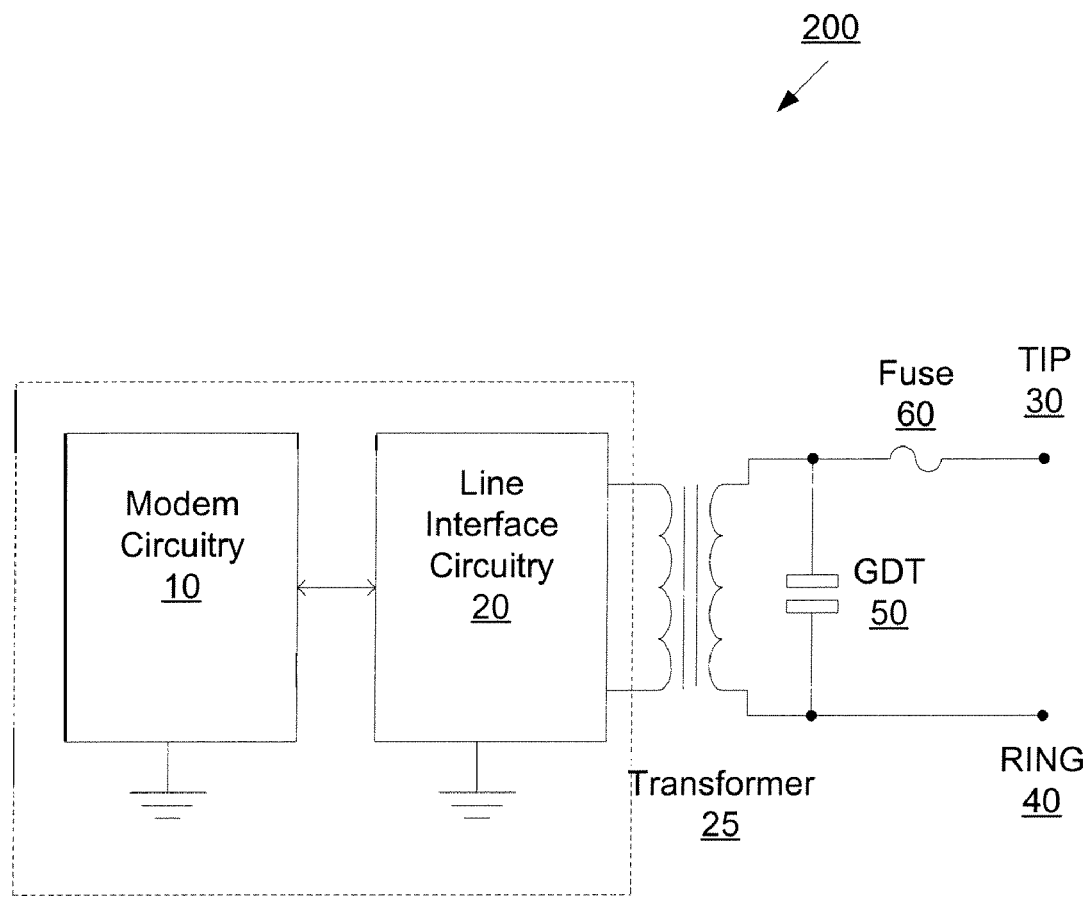
FIG. 2 illustrates a schematic diagram of an embodiment of a surge protection circuit that provides protection in case of differential surges.

FIG. 2 illustrates a schematic diagram of a surge protection circuit 200. Although the circuits described herein include a DSL modem, it is recognized that a surge protection circuit can be included in any xDSL device, or more generally any modem device. FIG. 2 illustrates a GDT 50 connected between the TIP 30 and RING 40 lines to protect against overvoltages appearing differentially across the TIP 30 and RING 40 lines. GDT 50 withstands maximum ringing and battery voltages, generally up to 375V, which is the GDT's 50 breakover voltage, without breaking over. However, when any voltage greater than the breakover voltage appears differentially across TIP 30 and RING 40, GDT 50 breaks over and begins to conduct, thereby protecting the attached line interface circuitry 20 and modem circuitry 10. Although the line interface circuitry 20 is shown in FIGS. 2-8 as being separately coupled to the modem circuitry 10, the line interface circuitry 20 may indeed be included in the modem circuitry 10. The transformer 25 is a simplified representation of a transformer used to obtain the required isolation from TIP 30 and RING 40 to circuit ground.

Fuse 60 is a fuse that has a rating such that it will not open in the presence of typical test lightning surges. A fuse is a device designed to provide protection for a given circuit or device by physically opening the circuit. Thus, the role of fuse 60 is to open in the presence of 600 VAC steady state differential voltage that corresponds to the UL line cross test. The UL line cross test simulates what might happen if a high voltage power line couples, either directly or through induction, into the phone line. During test lightning surges, the GDT 50 conducts but there will not be enough current flowing to open the fuse. This is because the duration of the test surges are short. However, during the UL line cross test, the GDT 50 will conduct enough current to open the fuse.

Figure 3:
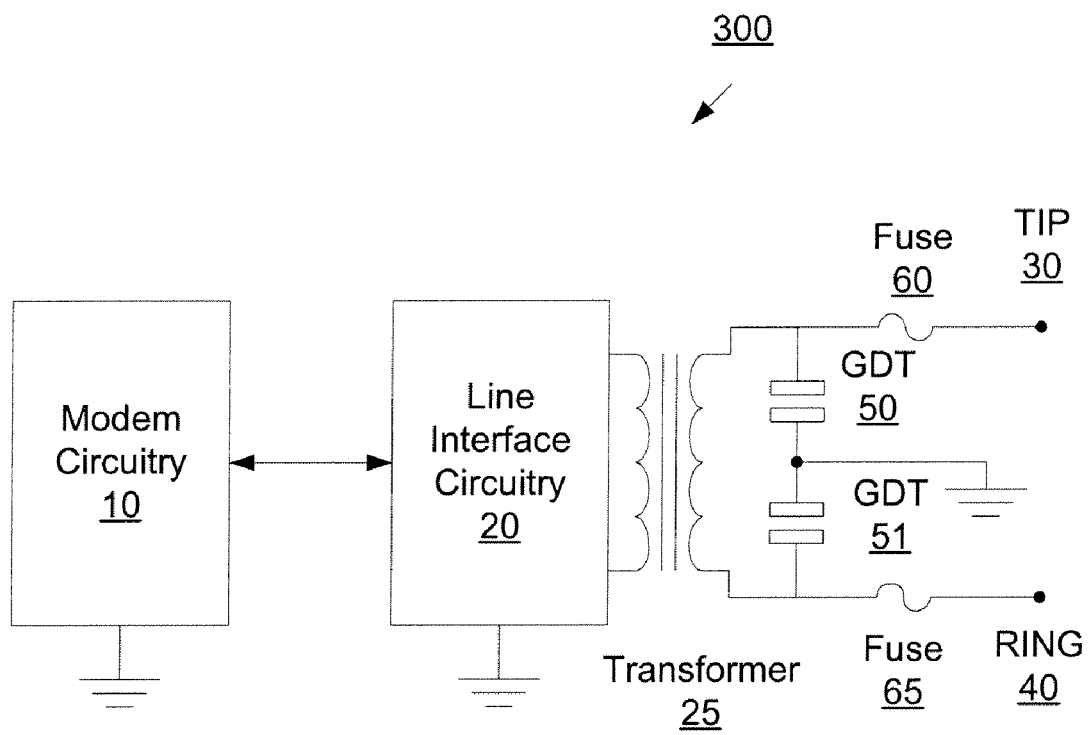
FIG. 3 illustrates a schematic diagram of an embodiment of a surge protection circuit that provides protection in case of both common mode and differential surges.

A problem with the typical circuit shown in FIG. 2 is that it merely protects against lightning surges and coupled power line voltages that appear differentially across TIP 30 and RING 40. Indeed, lightning surges are much more likely to appear equally on TIP 30 and RING 40 with respect to earth ground. Such a scenario is called "common mode" herein. Therefore, it would be beneficial to have a circuit that protects against common mode surges as well as differential surges. FIG. 3 shows a circuit that protects against differential and common mode lightning surges.

FIG. 3 shows a second surge protection circuit 300, which utilizes a second GDT 51 being connected between the TIP 30 and RING 40. Thus, when an overvoltage is applied, both GDT 50 and GDT 51 break over and conduct to ground, thus grounding the overvoltage. As can be seen, two GDTs 50 and 51 are required to provide common mode surge protection. Then, in order to keep the GDTs 50 and 51 from conducting during the UL line cross test, a second fuse 65 may be used. This is because the line cross test is applied both differentially and common mode.

The surge protection scheme 300 shown in FIG. 3 is more robust than that of FIG. 2 against real world lightning surges, but requires four protection components: two GDTs and two fuses. Accordingly, in order to protect two phone line interfaces, eight protection components would be required, which is costly. Therefore, it would be advantageous to find a more economical means of obtaining robust protection against differential and common mode lightning surges.

Figure 4:
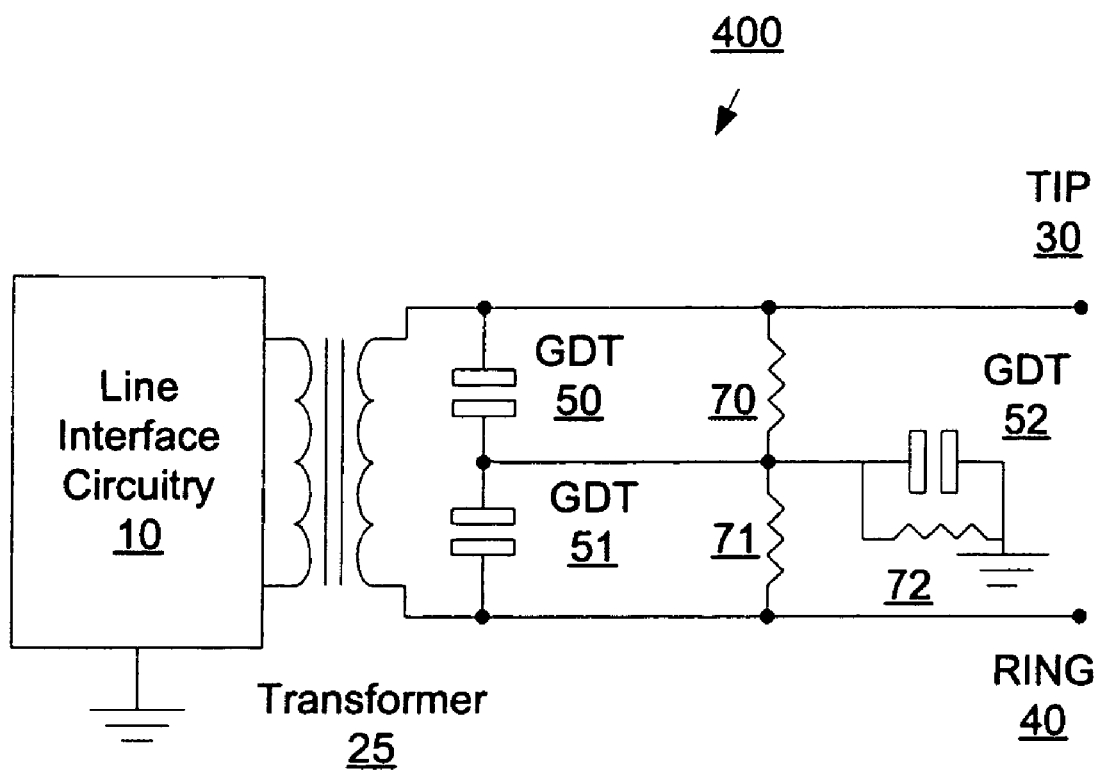
FIG. 4 illustrates a schematic diagram of an embodiment of a surge protection circuit that provides protection in case of both common mode and differential surges according to certain embodiments of this invention.

FIG. 4 illustrates a schematic diagram of an embodiment of a surge protection circuit 400, which provides protection against common mode and differential overvoltages and withstands overvoltages without using expensive fuse elements. GDT 50 and GDT 51 are coupled together in series. If both GDT 50 and GDT 51 have the same breakover voltage $V_b$, e.g. 600V, and the same residual capacitance, then the series connection can withstand a differential voltage of up to twice $V_b$. However, if the residual capacitance is different, e.g. if GDT 50 has a residual capacitance of ⅓ pF and GDT 51 has a residual capacitance of ⅔ pF, then ⅔ of the differential voltage will be applied across GDT 50 and ⅓ of the differential voltage will be applied across GDT 51. ⅔ of the differential voltage applied across GDT 50 may cause GDT 50 to break over, causing the entire differential voltage to be applied across GDT 51, in turn causing GDT 51 to also break over. Thus, the sequential break over of GDT 50 and GDT 51 at a substantial lower magnitude differential voltage between TIP 30 and RING 40 than the breakover voltage threshold setting of the sum of GDT 50 and GDT 51 occurs.

This problem is solved by choosing resistors 70 and 71 to cause the differential voltage to divide evenly across GDT 50 and GDT 51. In other embodiments, other types of voltage divider devices, such as capacitors, inductors, and other electrical devices can be used. Resistors 70 and 71 are also coupled together in series to each other and in parallel to the series coupling of GDT 50 and GDT 51. Accordingly, resistors 70 and 71 are chosen to be of sufficiently large resistance value so as to dominate the residual capacitances in GDT 50 and GDT 51. For instance, in one embodiment, resistors 70 and 71 can be chosen to be 10 MΩ each. Thus, the configuration of a series combination of GDT 50 and GDT 51 connected in parallel to a series combination of resistors 70 and 71 operates to withstand a differential voltage of up to twice $V_b$.

Surge protection circuit 400 also provides protection in the common mode case, in which both TIP 30 and RING 40 experience the same overvoltage. Thus, in effect TIP 30 and RING 40 get tied together, which places GDT 50 in parallel with GDT 51, together in series with GDT 52. This combination also breaks over at 2 times the voltage breakover threshold set for each gas discharge tube or 2 Vb, thus passing the UL 600V AC line cross test. To ensure that the voltage divides evenly, resistor 70 in parallel with resistor 71 is placed in series with resistor 72. In one embodiment, resistor 72 is sized to be equal to the resistance value of a combination of resistor 70 in parallel with resistor 71. For example, if both resistors 70 and 71 are 10 MΩ each, resistor 70 is sized to be 5 MΩ.

Accordingly, the surge protection circuit 400 provides protection against common mode and differential overvoltages and withstands overvoltages without using expensive fuse elements and by using inexpensive resistors and three GDTs. In the embodiment shown in FIG. 4, the GDTs are arranged in wye configuration. The GDTs can also be arranged in delta configuration.

According to certain embodiments of the present invention, GDTs 50 and 51 are sized so that they do not trip under 600 V rms (or 850 V peak) power line contact conditions. Since GDTs have 20% tolerance on DC sparkover, the breakover voltage total of GDTs 50 and 51 must be at least (850/0.8)=1063 V. Since 1063 V divided by 2 equals 532 V, the breakover voltage of both GDT 50 and 51 must be at least 532V. In one embodiment, GDTs with 600 V breakover voltage can be selected as GDT 50 and 51. To determine the breakover voltage of GDT 52, it is to be noted that during common mode, one half of GDT 51 in parallel with GDT 51 in series with GDT 52 must withstand a voltage of 1063 V. Therefore, GDT 52 must withstand a minimum of 532 V.

It is to be recognized that while GDTs are used in FIGS. 4-7 other types of voltage protection devices having a voltage threshold, the voltage protection device to conduct when the device at least meets the voltage threshold, such as a MOV, a thyristor, a sidactor, or similar device, may be used. However, a gas discharge tube may have a lower internal capacitance value associated with it, than a sidactor or a thyristor, which can be beneficial for systems that carry DSL transmissions. Accordingly, the breakover voltage of the device is sized to withstand conduction when common mode and differential test voltages are applied but arc over to occur when exposed to overvoltages such as a lighting strike.

Figure 5:
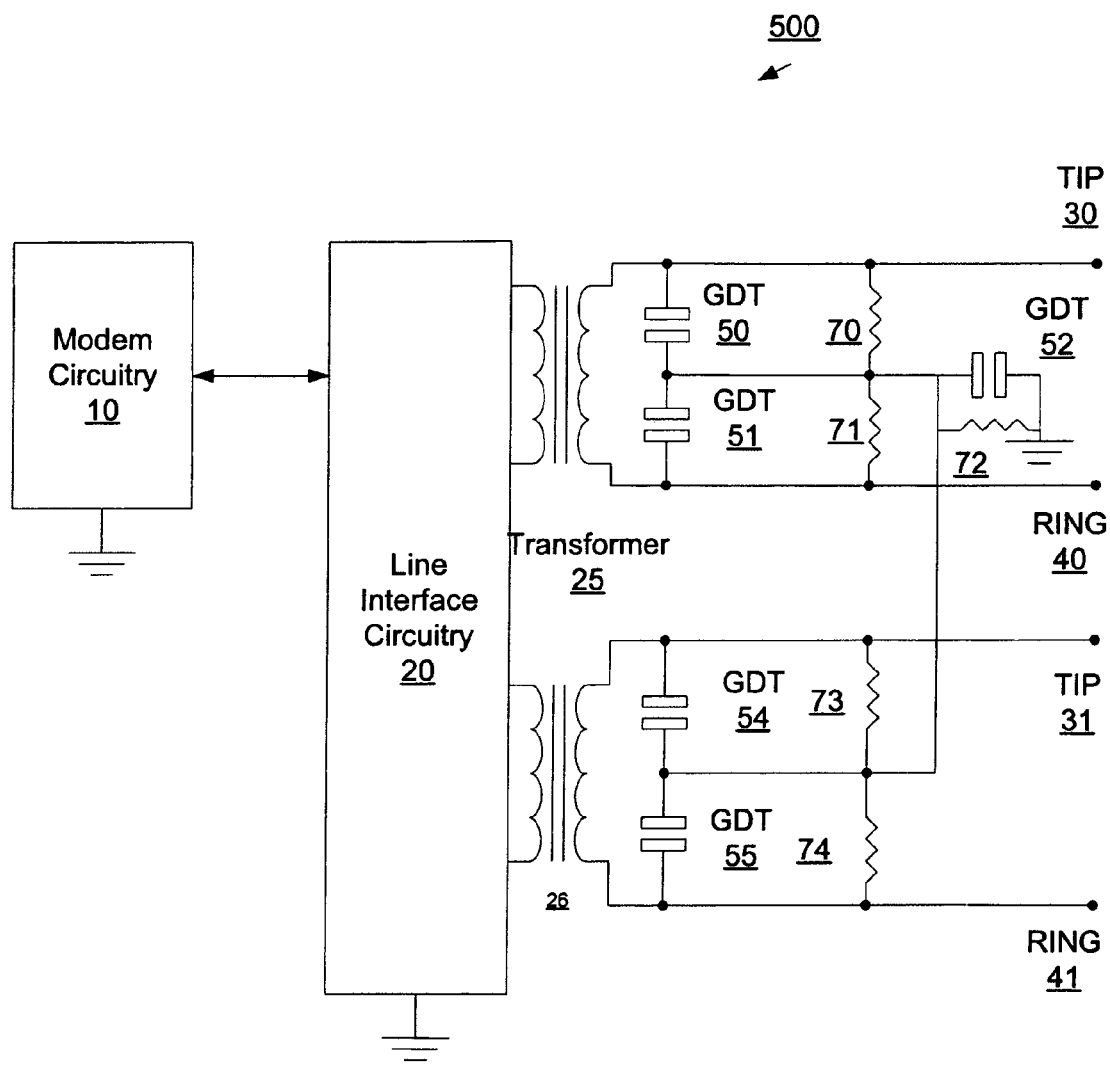
FIG. 5 illustrates a schematic diagram of an embodiment of a surge protection circuit that provides protection in a two-line system in case of both common mode and differential surges according to certain embodiments of this invention.

FIG. 5 illustrates a schematic diagram of a two-line protection circuit 500. The two-line protection circuit 500 couples a first line (TIP 30 and RING 40) and a second line (TIP 31 and RING 41) to interface circuitry 20 respectively via transformers 25 and 26. In one embodiment, the surge protection circuits across the first line and the second line are the same circuits as described in FIG. 4, with one major difference: GDT 52 is shared by both circuits, providing common mode protection for both circuits. Thus, circuit 500 having five GDTs protects two telephone wire lines from voltages greater than 350 volt. Circuit 500 is thus advantageous in that it reduces the number of components required to provide differential and common mode overvoltage protection for multiple lines.

Figure 6:
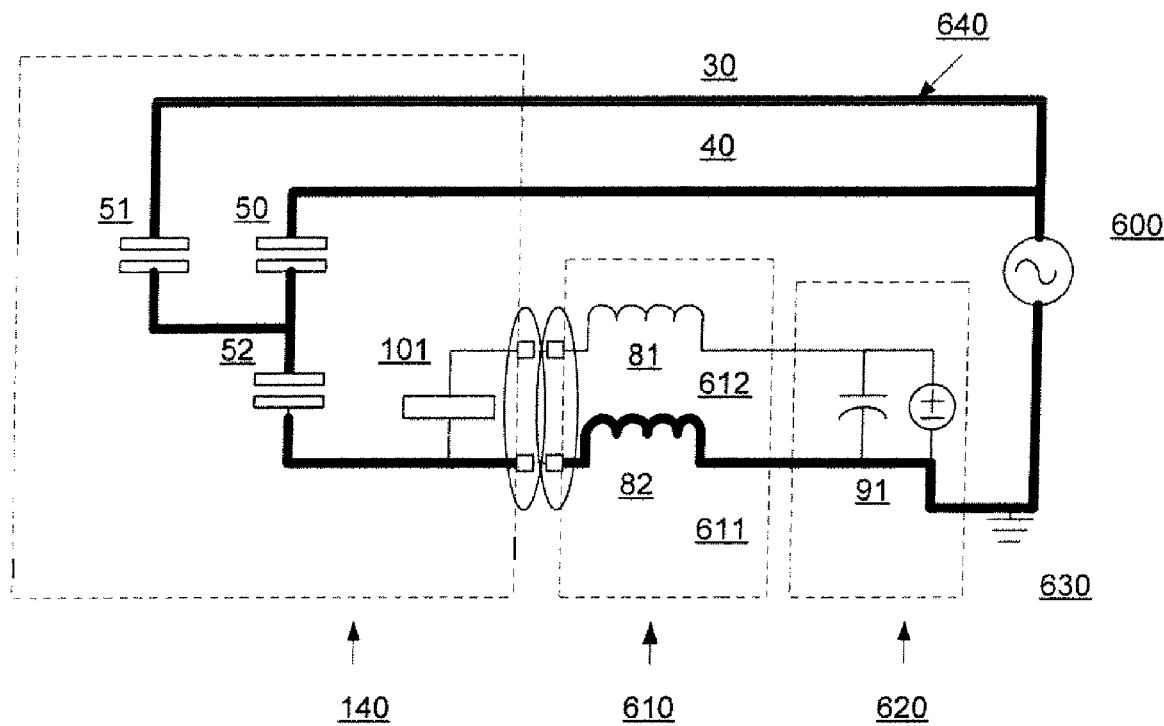
FIG. 6 illustrates a path of an embodiment of a surge current through a surge protection circuit to earth ground.

Ground currents from overvoltage conditions are returned to ground during a common mode surge event. During a common mode surge event, TIP 30 and RING 40 are effectively shorted together. FIG. 6 shows the surge protection scheme 300 as implemented in a xDSL device 140, a power supply cable circuit 620 and a DC power supply cable circuit 610. The DC power supply circuit 620 feeds a voltage input to the xDSL device 140 via the power supply cable 610. Typically, the DC power supply circuit 620 has an internal capacitance 91. In one embodiment, the DC power supply circuit 620 contains a power adapter that converts a 120V AC input to DC voltage. The power supply cable 610 may have two conductors, a ground conductor 611 and a positive voltage conductor 612. Reference number 101 in FIG. 6 represents the capacitance of active integrated circuits and other components that are powered from conductor 612.

During common mode testing, upon the application of a current source 600, such as a lightning surge, the TIP 30 and RING 40 are effectively shorted together as shown. The path 640 indicates the supply and return path of the surge current. When the surge event occurs, the GDTs 50-52 will conduct allowing surge current to return to earth 630 through the inductance 82 of the ground conductor 611 of the power supply cable 610. The inductor 82 stores energy during the surge event, then dissipates it afterward by circulating currents through inductance 81 of the positive voltage conductor 612 of the power supply cable 610 and capacitances 91 and 101. These circulating currents can cause overvoltage conditions to occur on positive voltage conductor 612, which may result in damage to the attached electrical components 101.

Figure 7:
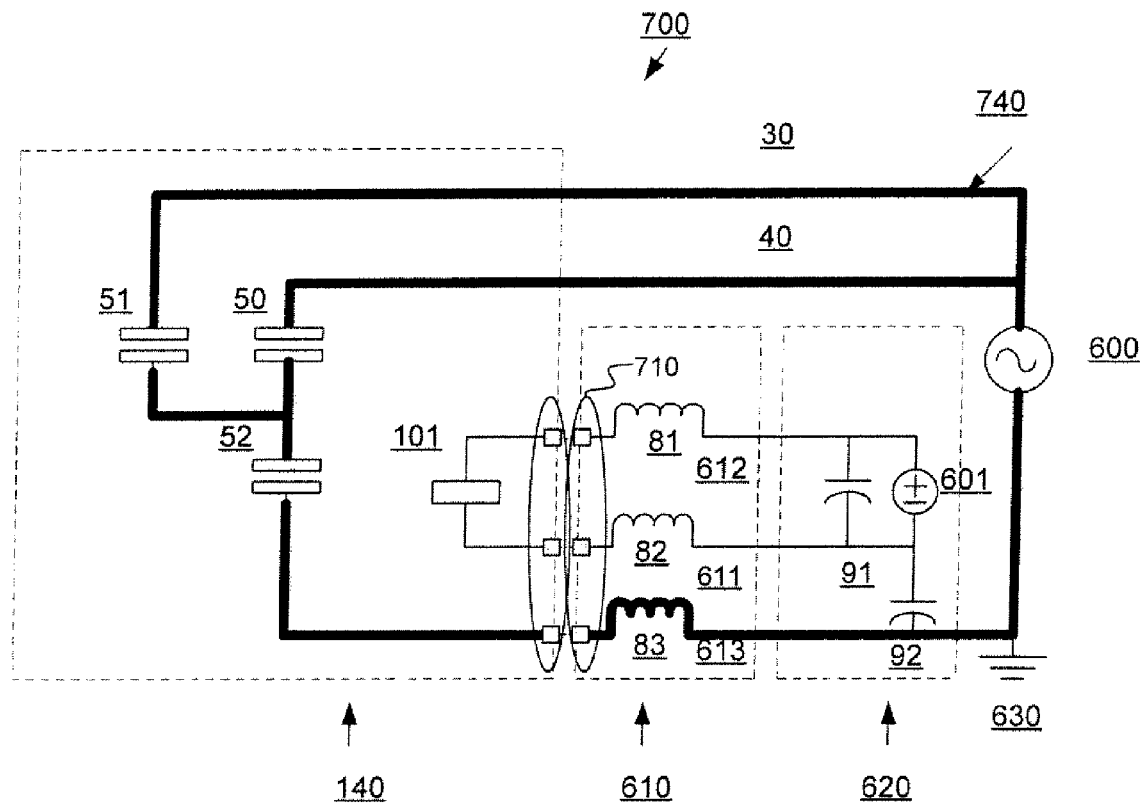
FIG. 7 illustrates a schematic diagram of an embodiment of a surge protection circuit that prevents the surge current from circulating in the circuit.

FIG. 7 illustrates a schematic diagram of an embodiment of a circuit 700 to prevent circulating currents. Three wire power supply cable solves problem of surge return currents disturbing the power supply voltage of the device, such as a DSL modem. In the embodiment shown in FIG. 7, an earth conductor 613 is added to the power supply cable 610 and is connected to earth ground 630 to provide a separate return path for the surge return current.

The path 740 indicates the supply and return path of the surge current. When the surge event occurs, the GDTs will conduct allowing surge current to return to earth 630 through the inductance 83 of the earth conductor 613 of the power supply cable 610. There will be no circulating currents through the power supply since the current has no loop to dissipate through. It will be recognized that surge return current will cause energy to be stored in the inductance 83 of the earth conductor 613; however, since inductance 83 is isolated from the power supply circuit 620, there will be no harmful voltage changes induced into the power supply. Further, the DC power supply 620 may have some leakage capacitance 92, which is negligible. The leakage capacitance 92 represents the interwinding capacitance between the windings of the AC transformer of the power adapter. Circuit 700 uses a three pin power connector 710, the pin connector to receive a connector from an external power supply 620 to power the circuitry 140.

Figure 8:
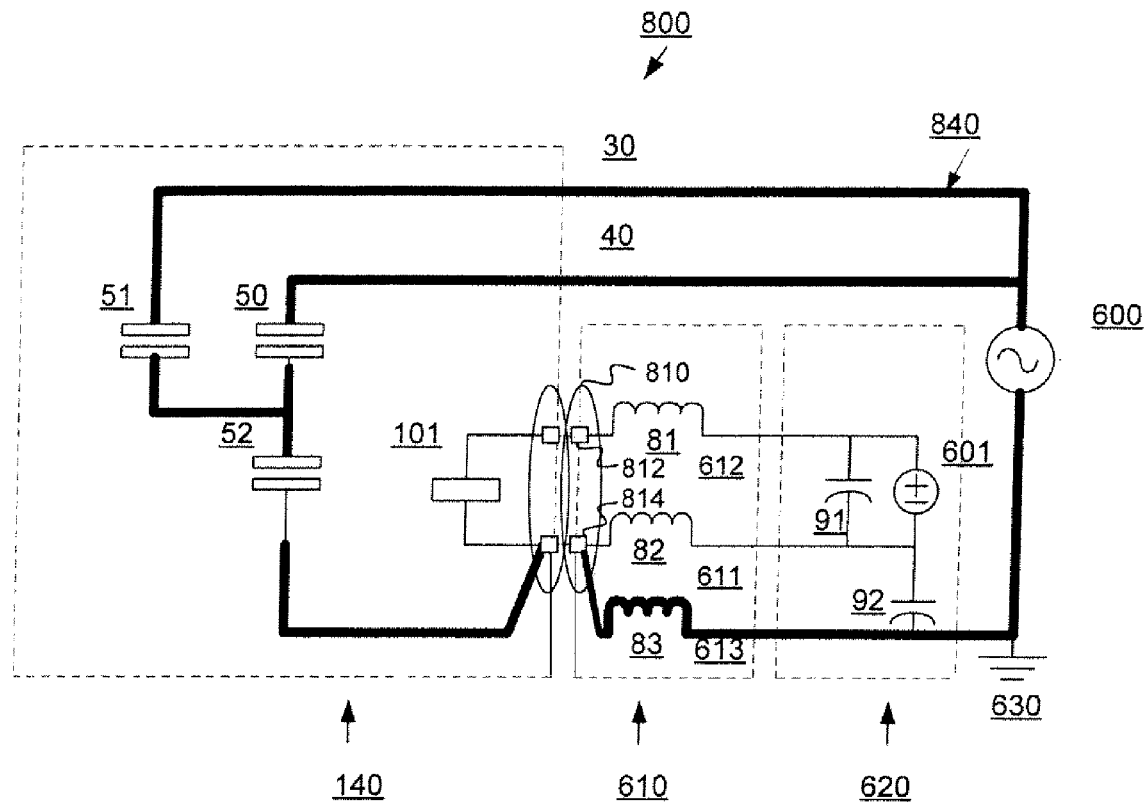
FIG. 8 illustrates a schematic diagram of another embodiment of a surge protection circuit that prevents the surge current from circulating in the circuit.

FIG. 8 illustrates a schematic diagram of an embodiment of a circuit 800 to prevent circulating currents using a two pin power connector. The circuit 800 is similar to circuit 700 in that a three conductor power supply cable is required. However, in circuit 800, the earth conductor 613 is connected to the ground conductor 611.

The path 840 indicates the supply and return path of the surge current. When the surge event occurs, the GDTs 50, 51 and 52 will conduct allowing surge current to return to earth 630 through the inductance 83 of the earth conductor 613 of the power supply cable 610. It will be recognized that the inductance 83 of the conductor 613 stores energy during the surge event, and if leakage capacitance 92 were large enough, there would be some circulating currents, which could affect the power supply voltage. However, since leakage capacitance 92 is negligible, any circulating currents are also negligible, effectively causing no disturbance to the power supply. This allows the surge return current to remain separate while using a standard two pin power connector 810 having pins 812 and 814.

While some specific embodiments of the invention have been shown the invention is not to be limited to these embodiments. For example, the line may be any line configured to carry a broadband signal such as a DSL signal. The transmit and receive signals may be complimentary differential voltage signals, voltage signals made with respect to a common ground, or other similar voltage signal. The impedance component may be composed a single group of components or multiple groups of components. The XDSL technology, such as ADSL, ADSL2+, VDSL, VDSL2, etc. may continue to adapt into newer versions of this broadband technology. The line interface circuit may have a single or split source impedance component. The circuit may have transformer winding ratios other than 1:1. The invention is to be understood as not limited by the specific embodiments described herein, but only by scope of the appended claims.

The invention claimed is:

1. An apparatus, comprising:
   a digital subscriber line modem comprising a surge protection circuit having a first voltage protection device coupled to a first TIP wire of a Public Switched Telephone Network (PSTN), a voltage protection device to conduct when voltage applied across the voltage protection device at least meets a set voltage threshold, a second voltage protection device coupled to a first RING wire of the PSTN, the second voltage protection device coupling to the first voltage protection device, and a third voltage protection device coupled to the first voltage protection device and second voltage protection device in a wye configuration; and
   an external power supply, wherein the modem is connected to the external power supply to power the modem using a cable comprising a modem side two pin connector, wherein the cable further comprises:
      a positive voltage conductor having a first end coupled to a first one of the two pins of the modem side two pin connector, wherein the positive voltage conductor has a second end coupled to a first conductor in the power supply;
      a neutral conductor having a first end coupled to a second one of the two pins of the modem side two pin connector, wherein the neutral conductor has a second end coupled to a second conductor in the power supply; and
      an earth conductor having a first end coupled to the neutral conductor and the second one of the two pins of the modem side two pin connector, wherein the earth conductor has a second end coupled to a third conductor in the power supply being different than the second conductor in the power supply, wherein the second end of the earth conductor is further connected to earth ground through the power supply to provide a return path for surge return current.

2. The apparatus recited in claim 1, further comprising a voltage divider device configured to provide a voltage applied differentially across the first TIP wire and first RING wire to divide evenly across the first voltage protection device and the second voltage protection device, wherein the voltage divider device comprises a series coupling of a first resistor and a second resistor connected in parallel to the first voltage protection device and the second voltage protection device.

3. The apparatus recited in claim 2, wherein the third voltage protection device is connected in parallel to a third resistor.

4. A method, comprising:
   applying a voltage to a surge protection circuit of a digital subscriber line modem through a TIP and/or RING wire of a Public Switched Telephone Network (PSTN), wherein the surge protection circuit having a first voltage protection device being coupled to a second voltage protection device and a third voltage protection device being coupled to the first and the second voltage protection devices in a wye configuration;
   producing a surge current when the voltage applied at least meets a set voltage threshold, wherein the surge current flows from the digital subscriber line modem to a cable through a first pin of a modem side two-pin connector of the cable; and
   providing a return path for the surge current to be grounded without allowing the surge current to loop back to a power supply providing the applied voltage, wherein the return path includes a earth conductor, of the cable, having a first end being coupled to the first pin of the modem side two-pin connector of the cable and having a second end being grounded through the power supply, wherein the return path prevents the surge current from entering a neutral conductor through the first pin of the modem side two-pin connector, the neutral conductor having a first end being coupled to the first pin of the modem side two-pin connector of the cable and having a second end coupled to a first conductor in the power supply, or a positive voltage conductor through the second pin of the modem side two-pin connector, the positive voltage conductor having a first end coupled to a second pin of the modem side two-pin connector and a second end coupled to a second conductor in the power supply.

* * * * *

UNITED STATES PATENT AND TRADEMARK OFFICE
CERTIFICATE OF CORRECTION

PATENT NO.       : 7,602,596 B1                                    Page 1 of 1
APPLICATION NO. : 11/212161
DATED            : October 13, 2009
INVENTOR(S)      : Schley-May et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Fifth Day of October, 2010

David J. Kappos
*Director of the United States Patent and Trademark Office*